J. AND H. TRUST.
FOOD MACHINE.
APPLICATION FILED SEPT. 18, 1919.

1,418,108.

Patented May 30, 1922.

INVENTORS
Josephine Trust
Henry Trust
BY
ATTORNEY

UNITED STATES PATENT OFFICE.

JOSEPHINE TRUST AND HENRY TRUST, OF PARK RIDGE, NEW JERSEY, ASSIGNORS, BY MESNE ASSIGNMENTS, TO METEOR MIXING MACHINE CO., INC., A CORPORATION OF NEW YORK.

FOOD MACHINE.

1,418,108.  Specification of Letters Patent.  Patented May 30, 1922.

Application filed September 18, 1919. Serial No. 324,606.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Food Machines, of which the following is a specification, reference being had therein to the accompanying drawings.

Our invention relates to improvements in food machines and particularly relates to a machine adapted for the use of interchangeable tools so that the same machine may be used for whipping, beating, grating, grinding or other tools for the treatment of food products.

Figure 1:
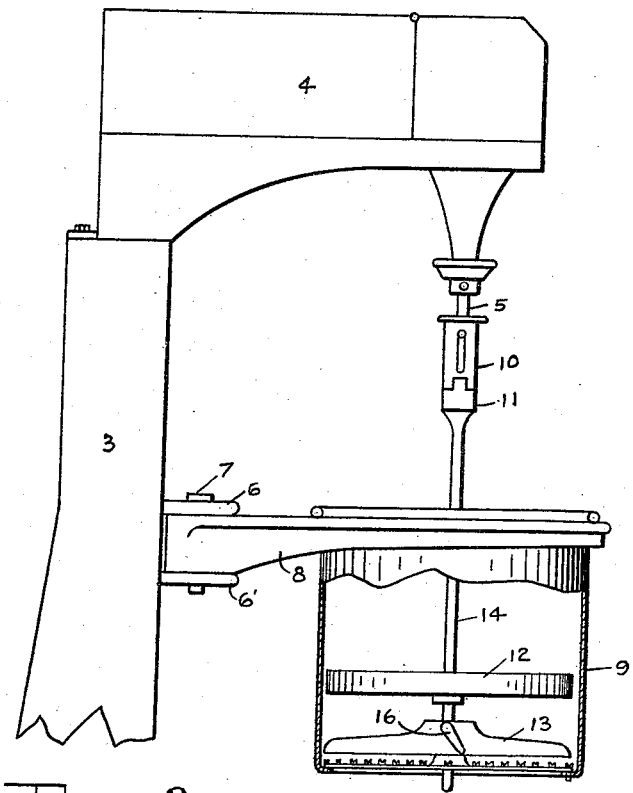
Figure 2:
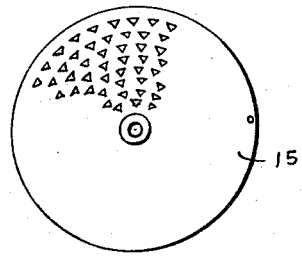

In the accompanying drawings, we have illustrated in Fig. 1 in side elevation partly broken away and partly in cross section, a suitable form of machine illustrating an embodiment of our invention. Fig. 2 is a plan view of the grater thereof. 3 indicates the standard and 4 transmission box through which power is transmitted to the spindle 5. 6—6' indicate suitable lugs through which the pin 7 may be introduced for holding the bracket 8 for supporting the pail 9.

10 indicates a vertically slidable clutch for engaging the top of the tool 11 which carries a weighted disc 12 free to slide vertically thereupon and has secured near the lower end the feeder 13, the end of tool spindle 14 projecting through the bottom of the pail as shown. 15 indicates a grating disc having teeth or lips formed thereon as shown and the feeder 13 is provided with blades or paddles such as 16 inclined at an angle to feed the food such as horse radish, against the grater.

In operation, the disc 12 is lifted clear of the top of the pail and horse radish or other suitable material to be grated is thrown into the pail beneath said disc, thus allowing the weight of the disc 12 to hold food down upon the bottom of the pail so that when the feeder 13 is rotated, the food is ground until the last remains pass through the removable disc screen 15 after which the same may be removed for cleaning, repair or the like.

Of course, it will be understood that various modifications may be made in the construction and arrangement of parts without departing from the spirit of the invention as claimed:

We claim:

In a machine of the class described, a vertical spindle and means for detachably securing a tool shaft therein, means for retaining a receptacle beneath said spindle, means for immovably retaining a grater in the bottom of said receptacle, a feeder upon said spindle, a weight above said feeder for feeding material to said feeder, and said feeder having blades pitched at an angle so as to press material in the direction of said grater, and said grater adapted to provide bearing for said tool shaft.

In testimony whereof we hereunto affix our signatures in the presence of two witnesses.

JOSEPHINE TRUST.
HENRY TRUST.

Witnesses:
 MADELINE C. FOERST.
 DAVID H. DOUGLASS.